(12) United States Patent
DeGrazia (10) Patent No.: US 8,473,851 B2
(45) Date of Patent: Jun. 25, 2013

(54) MULTI-PARTY VIRTUAL DESKTOP

(75) Inventor: Brad DeGrazia, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 832 days.

(21) Appl. No.: 12/072,682

(22) Filed: Feb. 27, 2008

(65) Prior Publication Data

US 2009/0217177 A1    Aug. 27, 2009

(51) Int. Cl.
  *G06F 3/048* (2006.01)
  *G06F 15/16* (2006.01)

(52) U.S. Cl.
  USPC .......................................... 715/753; 715/778

(58) Field of Classification Search
  USPC .................................. 715/778, 753
  See application file for complete search history.

(56) References Cited

U.S. PATENT DOCUMENTS

| | | | |
|---|---|---|---|
| 5,241,625 A | 8/1993 | Epard et al. | |
| 5,940,488 A | 8/1999 | DeGrazia et al. | |
| 6,677,979 B1 | 1/2004 | Westfield | |
| 6,710,790 B1 | 3/2004 | Fagioli | |
| 7,010,755 B2 | 3/2006 | Anderson et al. | |
| 7,451,181 B2* | 11/2008 | Sasaki et al. | 709/204 |
| 2004/0179036 A1* | 9/2004 | Teplov et al. | 345/751 |
| 2005/0132299 A1* | 6/2005 | Jones et al. | 715/759 |
| 2005/0223343 A1* | 10/2005 | Travis et al. | 715/862 |
| 2006/0136828 A1* | 6/2006 | Asano | 715/733 |
| 2007/0050613 A1* | 3/2007 | Islam et al. | 713/150 |
| 2010/0241972 A1* | 9/2010 | Spataro et al. | 715/753 |

* cited by examiner

*Primary Examiner* — Chat C. Do
*Assistant Examiner* — Andrea Leggett
(74) *Attorney, Agent, or Firm* — Cindy Kaplan (57) ABSTRACT

In one embodiment, a method for sharing data displayed on a user's computer screen includes displaying a movable tile on the user's computer screen, the tile being positionable on the computer screen to identify data displayed on the user's computer screen and selected for sharing with one or more remote users. The method further includes transmitting the data identified by a position of the tile on the user's computer screen to the remote users, receiving shared data from one of the remote users, and displaying the shared data on the user's computer screen. The identified data includes only a portion of data displayed on the user's computer screen and the shared data corresponds to data displayed on a portion of said remote user's computer screen.

20 Claims, 11 Drawing Sheets

```
Microsoft Visual Studio
Project  Build  Debug  Tools  Window  Community  Help FileLoader.cpp  MosaicDatabase.cpp  vector  sql.h  Subscriber.h  ClientSvc.h  natDlg.cpp  natDlg.h
(Global Scope)                              LoadHtml(const CString& strFilename, LPCWSTR lpszChoice, int include "stdafx.h"
    #include "FileLoader.h"
    #include "NTP Helpers.h"

CString LoadHtml( const CString& strFilename, LPCWSTR lpszChoice /*= NULL*/, int
    {
        CStringstrRet;
        CStringstrPath;
        strPath.Format( L".\\html\\%s", strFilename );

// First load file
        CFile f;
        if ( fOpen (strPath, CFile::modeRead) )
        {
            DWORD dwLen = (DWORD) f.GetLength();
            if ( ( dwLen > 0 )
            {
                CStringA strA;
                LPSTR lpsz = strA.GetBuffer( dwLen );
                strA.ReleaseBuffer( f.Read(lpsz, dwLen) );
                strRet = strA;
            }
            f.Close();
        }
```
← 75 admin

MULTI-PARTY VIRTUAL DESKTOP

BACKGROUND OF THE INVENTION

The present disclosure relates generally to multi-party sharing of data displayed on a computer screen.

With the increase in telecommuting and employees located worldwide, real-time collaboration has gained momentum as an important component in multimedia communications.

One example of conventional desktop sharing is a remote desktop in which a user can access a session that is running on their computer while at a remote computer. For example, the user can connect to their work computer from home and have access to their applications, files, and network resources as though the user were in front of their work computer. This type of desktop sharing is normally configured for use by one party located at the remote computer and the user typically has full access to entire applications and files.

Web conferencing is one example wherein multiple parties each having their own computer are connected to other participants via the Internet. The participants may use, for example, a web-based application where attendees of the meeting will simply enter a "URL" or website meeting address to enter the live meeting or conference. Each participant will then view the same presentation material on their desktop. If a participant wants to share data, the user has to upload the data so that it is available for other participants to view.

DESCRIPTION OF EXAMPLE EMBODIMENTS

Overview

A method and apparatus for sharing data displayed on a user's computer screen are disclosed.

In one embodiment, a method for sharing data displayed on a user's computer screen generally comprises displaying a movable tile on the user's computer screen, the tile being positionable on the computer screen to identify data displayed on the user's computer screen and selected for sharing with one or more remote users. The method further includes transmitting the data identified by a position of the tile on the user's computer screen to the remote users, receiving shared data from one of the remote users, and displaying the shared data on the user's computer screen. The identified data includes only a portion of data displayed on the user's computer screen and the shared data corresponds to data displayed on a portion of the remote user's computer screen.

In another embodiment, an apparatus generally comprises a processor configured to receive data from a plurality of users, generate shared tiles from the data, and transmit the shared tiles to the users for display on the users' computer screens. The received data corresponds to data displayed on only a portion of a user's computer screen and identified by a tile positioned on the computer screen. The apparatus further includes memory for at least temporarily storing said received data and said shared tiles.

Example Embodiments

The following description is presented to enable one of ordinary skill in the art to make and use the invention. Descriptions of specific embodiments and applications are provided only as examples, and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein allow remote computer users to share select portions of their local desktop in real-time without sharing an entire desktop or everything within a specific application. The method and system provide for a virtual desktop where people can meet and work together, while selectively and seamlessly sharing data. As described in detail below, a movable user interface element, referred to herein as a 'tile', is used to designate what portion of a local desktop a user wants to share. The portion of the desktop located within the tile is displayed on other user's desktop. In one embodiment, users within a group share a common virtual desktop which is referred to herein as a workspace or 'mosaic'.

Figure 1:
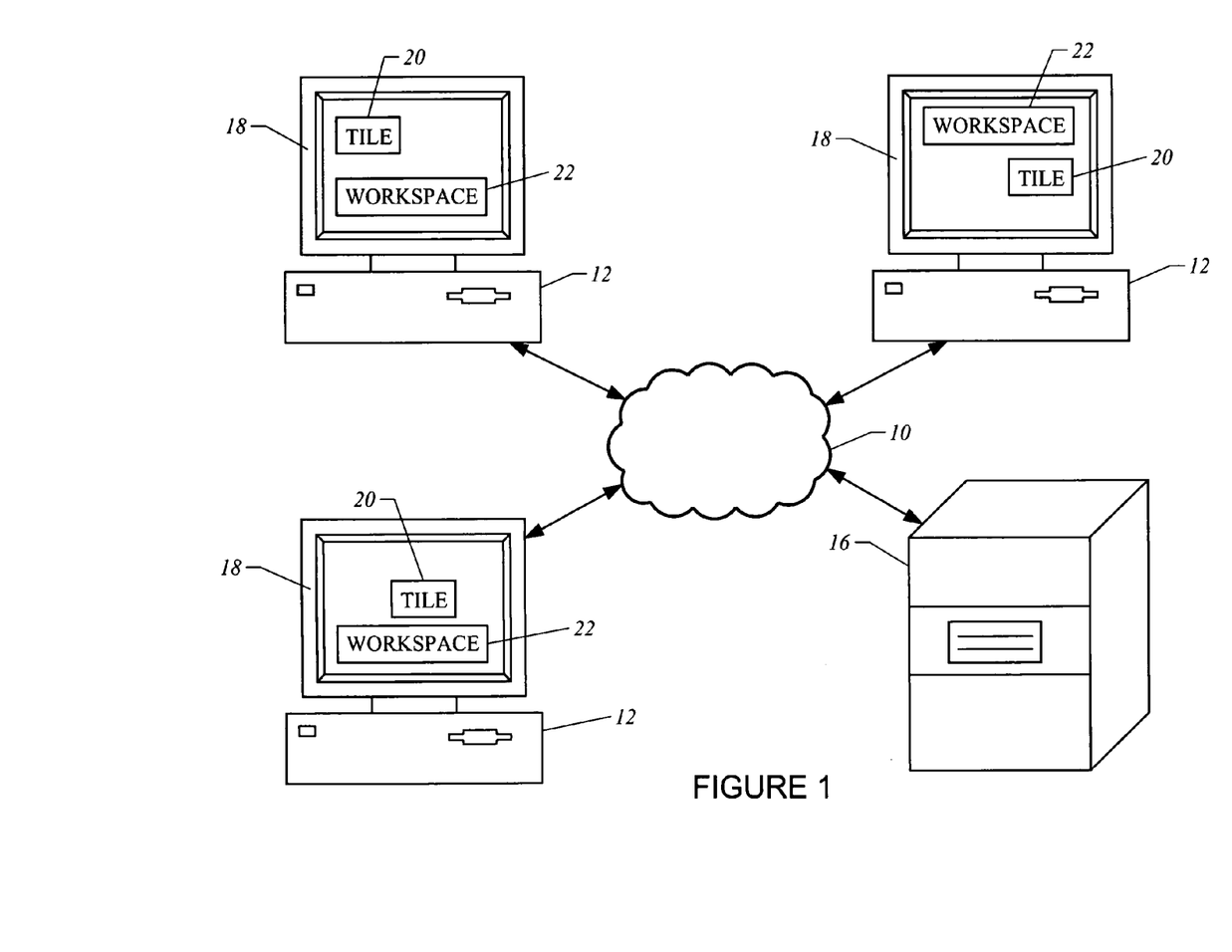
FIG. 1 illustrates an example of a network in which embodiments described herein may be implemented.

FIG. 1 illustrates an example of a network 10 in which embodiments described herein may be implemented. The network 10 provides communication between multiple computer systems 12. In one embodiment, a centralized device (e.g., server) 16 may be used for collecting and distributing shared data received from each of the users. Communication between the computers 12 and server 16 within the network 10 is made possible with the use of communication protocols, which govern how computers exchange information over a network. Data may be transmitted by any known method. For example, the data may be sent using IP packets, as well known by those skilled in the art.

As described in detail below, the computers each 12 include a display screen 18 comprising a desktop configured to display a user tile 20, for use in selecting data to share, and a workspace 22 containing shared data. The computers 18 are referred to herein as first, second, or third user computers, and local or remote user computers. It is to be understood that the terms local and remote as used herein may refer to geographically distributed computers or computers located in adjacent offices in a building, for example. The desktop computer 12 shown in FIG. 1 is only one example and any other device having a computer screen and configured for communication with other devices may be used. For example, the computer screen (desktop) may be on a laptop computer, handheld device, or wireless device. Furthermore, any number of users may participate in a desktop sharing session.

Figure 2:
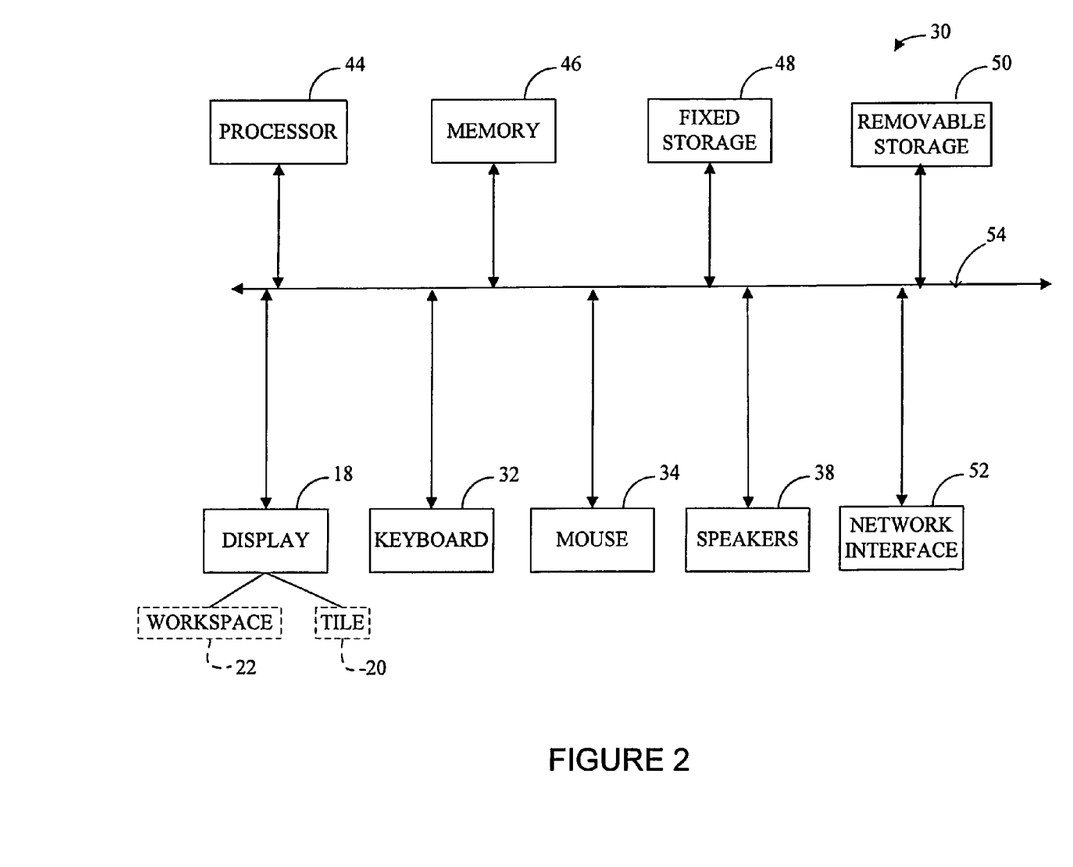
FIG. 2 is a block diagram of a computer system that may be used to implement embodiments described herein.

FIG. 2 illustrates an example of a computer system 30 that may be used to implement embodiments described herein. The computer system 30 includes one or more input devices (e.g., keyboard 32, mouse 34) which may include one or more buttons for interacting with a GUI (Graphical User Interface), and one or more output devices (display 18, speakers 38). The GUI, which is stored in memory 46 and executed by processor 44, represents programs, files, and selectable options with graphical images on the computer display screen 18. The user can select and activate the options by pointing and clicking the mouse 34 or entering data with the keyboard 32, for example. The GUI may be generated in Windows or Linux, for example, using well known methods for displaying windows and icons on a computer display as part of the respective operating systems.

Computer system 30 further includes subsystems such as the processor 44, system memory 46, fixed storage 48 (e.g., hard drive), removable storage 50 (e.g., CD-ROM drive), and network interface 52. Logic may be encoded in one or more tangible media for execution by the processor 44. For example, system memory 46 and storage 48 can be utilized to store and retrieve software programs incorporating computer code that implements aspects of the invention, data for use with the invention, and the like. Memory 46 may be volatile (e.g., RAM), non-volatile (e.g., ROM, flash memory), or a combination thereof. Computer storage media may also include DVDs or other optical storage, magnetic cassettes, tape, or disk storage, or any other medium that can be used to store information which can be accessed by the computer. Other computer systems suitable for use with the invention may include additional or fewer subsystems. For example, computer system 30 may include more than one processor 44 (i.e., a multi-processor system) or a cache memory.

The system bus architecture of computer system 30 is represented by arrows 54 in FIG. 2. However, these arrows are only illustrative of one possible interconnection scheme serving to link the subsystems. For example, a local bus could be utilized to connect the central processor 44 to the system memory 46. It is to be understood that computer system 30 shown in FIG. 2 is only one example of a computer system suitable for use with the invention. Other computer architectures having different configurations of subsystems may also be utilized without departing from the scope of the invention.

Figure 3:
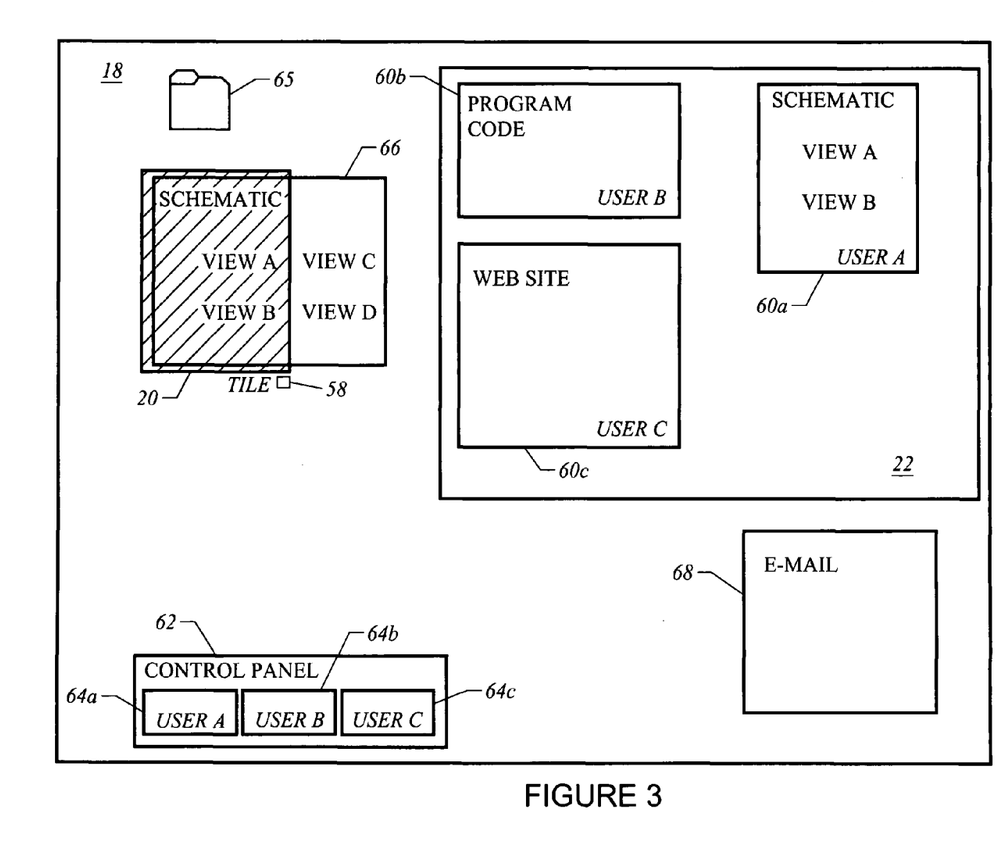
FIG. 3 is a schematic of a computer screen illustrating a tile and workspace for use in sharing data.

FIG. 3 illustrates an example of a screen 18 of a user's computer displaying a tile 20 and workspace 22. In one embodiment, the tile 20 is a semi-transparent rectangle that is displayed on a user's screen 18 and is easily movable to position over data visible on the display screen. The tile 20 is positionable on the computer screen 18 to identify data displayed on the screen and selected for sharing by the local user with one or more remote users. The shaded area covered by the tile 20 represents the data that is to be captured and shared with other participants (e.g., members of a conference or workgroup). The tile may be completely transparent or semi-transparent (shaded) as long as the data located on the computer screen and within the borders of the tile is exposed to the user.

The tile 20 may be dragged graphically across the display 18 into a selected area of the screen. For example, the user can drag the tile 20 across a portion of the desktop that he would like to share using a mouse. The tile 20 may include an icon (e.g., small control region referred to herein as a 'handle') 58 that can be used to move, size, and otherwise control the behavior of the tile. Additional operations for the tile include pausing (i.e., taking a static snapshot), shadowing an application or window, and shadowing the mouse pointer, which may be used for sharing items that involve moving all over a large area of the desktop. The location of the tile may be specified by two vertices of a rectangle, each vertex represented by an (x, y) pair of pixel values relative to the display screen 18, for example. It is to be understood that the term 'tile' as used herein refers to any type of user interface element (e.g., box, view port, window) that is movable on a user's computer screen. The tile shown in FIG. 3 is rectangular in shape, however, the tile may be other shapes including irregular shapes. Also, the tile 20 or handle 58 may be shaded any color for easy identification on the display screen 18. Also, the tile 20 may be completely transparent as long as the borders are well defined and easily recognized by the user.

Importantly, the tile 20 can be sized to limit sharing to only select information viewed on a user's desktop 18. Users can thus share only a portion of their desktop or application window, while still retaining a portion that is private. Sharing only portion of a desktop 18 allows other parts to remain private for multi-tasking users.

The tile 20 is not associated with a specific application or window. Therefore, whatever data (e.g., text, drawing, code, graph, photo, object, image, icon, and the like) is located within the border of the tile is shared. The tile 20 may be used to display any type of data that can be displayed on the user's own desktop 18 or associated with an image displayed on the user's desktop. The tile 20 itself does not interface with any underlying application and is effectively input transparent (i.e., mouse clicks and keyboard strokes pass through the tile as if it were not even there). The tile 20 provides generally instantaneous and continuous feedback as to what is being shared.

Tiles 20 may be active or passive. Passive tiles provide a screen capture and broadcast everything that is within the tile. Active tiles perform the same operation as passive tiles but also allow other users to interact with the user's desktop remotely. This can be useful for collaborating or receiving remote assistance from a help desk or other support personnel, for example. Mouse and keyboard input are limited to the confines of the tile 20 and special filtering may be provided to prevent malicious attempts to control windows or activities outside the confines of the tile.

In the example shown in FIG. 3, remote user B is sharing program code in shared tile 60b and remote user C is sharing a web site (or portion of a web site) in shared tile 60c. Remote users' shared tiles 60b, 60c are preferably displayed along with the user's tile representation 60a, in workspace 22. In one embodiment, the workspace utilizes a best-fit algorithm which adjusts the scale and position of each tile so that they all fit within the workspace window. The tiles are rendered in stand-alone popup application windows that can be positioned and managed individually. A control panel 62 (shown in the lower left-hand corner of the screen 18 in FIG. 3) may be used to hide or show a tile. The control panel 62 includes small icons 64a, 64b, 64c (normalized scale image (thumb)) each representing one of the users' shared tiles 60a, 60b, 60c. The icons 64a, 64b, 64c may be individually selected by a clicking on the right button of a mouse while a pointer is positioned over the icon, for example, to turn on or off the view of one or more of the associated users' shared tiles 60a, 60b, 60c. A user may position the shared tiles 60a, 60b, 60c anywhere within the workspace 22 (or desktop 18 if there is no designated workspace) and resize the shared tiles and workspace in a conventional drag and drop window sizing operation. The workspace 22 may also be configured to display only the remote users' shared tiles 60b, 60c (i.e., exclude a copy of the user's own tile 60a). The workspace 22 may also include other collaborative applications such as audio/video conferencing, chat, instant messaging, file sharing, etc. and may be used to share data, as described further below.

A remote user working in the same group or session with the local user would also have a workspace 22 as shown on the user's display screen 18. Thus, the workspace 22 on all of the users' displays will contain generally the same content. However, the shared tiles 60a, 60b, 60c may be arranged in a different order or sized differently in another user's workspace.

It is to be understood that while the shared tiles 60a, 60b, 60c are shown within a workspace 22 in the embodiment described herein, the shared tiles may also be displayed individually on a user's desktop 18 without being confined within a designated workspace. Thus, the workspace 22 shown in FIGS. 1 and 2 may refer to one or more shared tiles displayed on the user computer's desktop. In this case, shared tiles would be distributed individually to remote users without the use of a shared workspace.

The user tile 20 and shared tile 60a are maintained in general synchronization. Whenever a change on the computer screen 18 occurs that is within the user's tile 20, the shared tile 60a will be updated so that the display will accurately reproduce the portion of the screen image that is being displayed within the user's tile. This also applies to changes in the remote users' tiles and shared tiles.

A user's desktop typically includes one or more application windows associated with one or more applications running on the computer. Each application window shown on a user's desktop is typically associated with a software program configured to perform an operation (e.g., word processing, preparation of spreadsheet, drawing, or computer code, Internet browsing, photo editing, etc.). In the example shown in FIG. 3, the user has opened an application for viewing drawings and an e-mail application. A drawing (e.g., blueprint, schematic, presentation) 66 is displayed on the user's desktop 18 along with one or more e-mails 68. The drawing 66 includes a plurality of views (view A, view B, view C, view D). The user has placed the tile 20 over only two views (view A, view B) of the drawing. Thus, the remote users will only be able to see and interact with view A and view B of the drawing. This allows the user to share specific portions of the desktop, even select portions within an application, while preventing other users from viewing the entire desktop or portion of the desktop associated with an application. This allows, for example, a group to focus or work on only select views in case the other views are not ready to be shared or the user does not want to share the entire file for privacy or security reasons.

Figure 4:
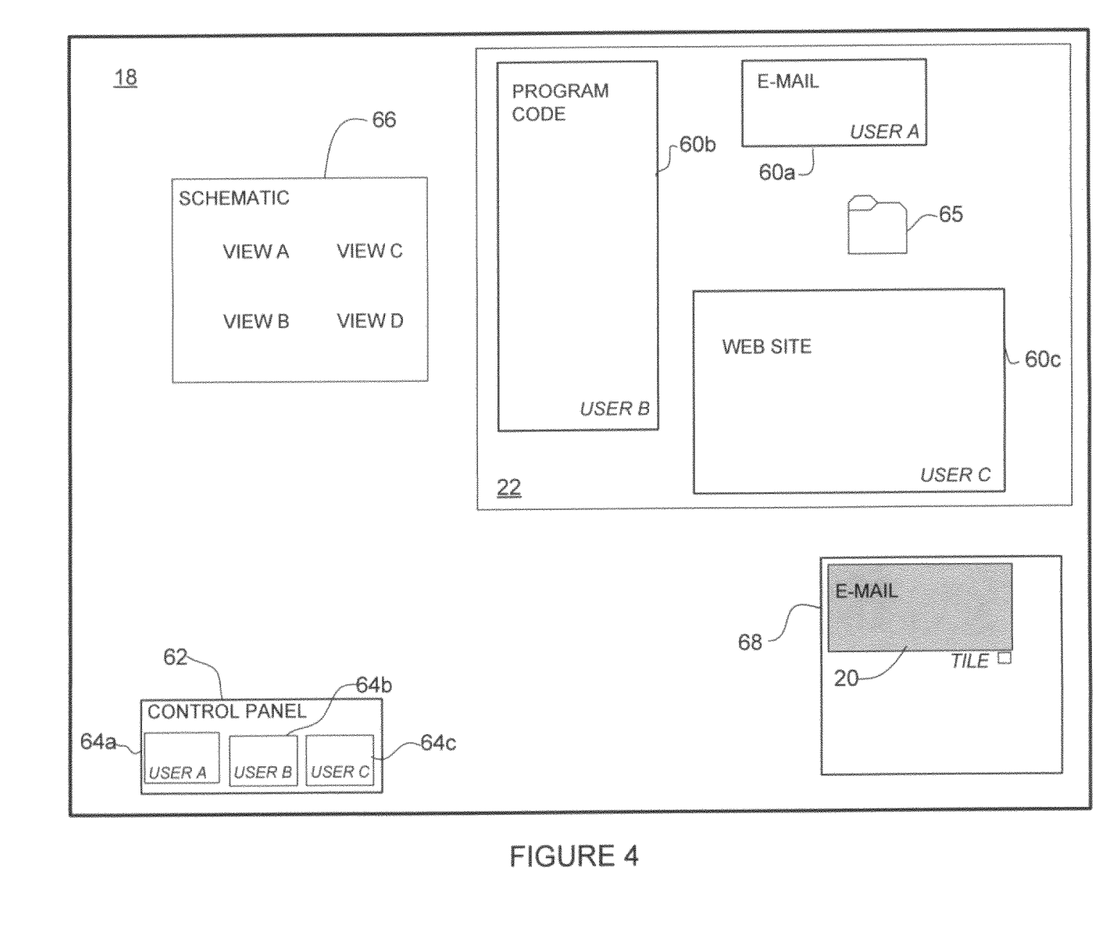
FIG. 4 is a schematic of the computer screen of FIG. 3 illustrating the tile moved to another location on the user's desktop.

FIG. 4 illustrates the user's computer screen 18 of FIG. 3 after the user has moved the tile 20 from the drawing 66 to a location shared with the e-mail application window 68. The tile 20 may be resized to expose only a portion of the e-mail 68. For example, the user may not want others in the group to see who sent the e-mail, in which case the user would place the tile 20 over only the text within the body of the e-mail without exposing the address of the e-mail. Shared tile 60a has been automatically updated to display the e-mail within the confines of the tile 20 (FIG. 4). The user has changed the position of the shared tiles 60a, 60b, 60c and resized the shared tiles within the designated workspace 22. As shown in FIG. 4, the user has also moved an icon representing a file 65 located on the desktop 18 to the workspace 22. When the user drags and drops the file 65 onto the workspace 22, it shows up as an icon in the other users' workspace and the users can drag and drop the file onto their desktop to make a local copy. Anything moved to the workspace 22 would preferably remain in the workspace until it is explicitly deleted. This allows the workspace 22 to operate as a team bulletin board where users can post things for others to see, read, and copy if desired.

Figure 5:
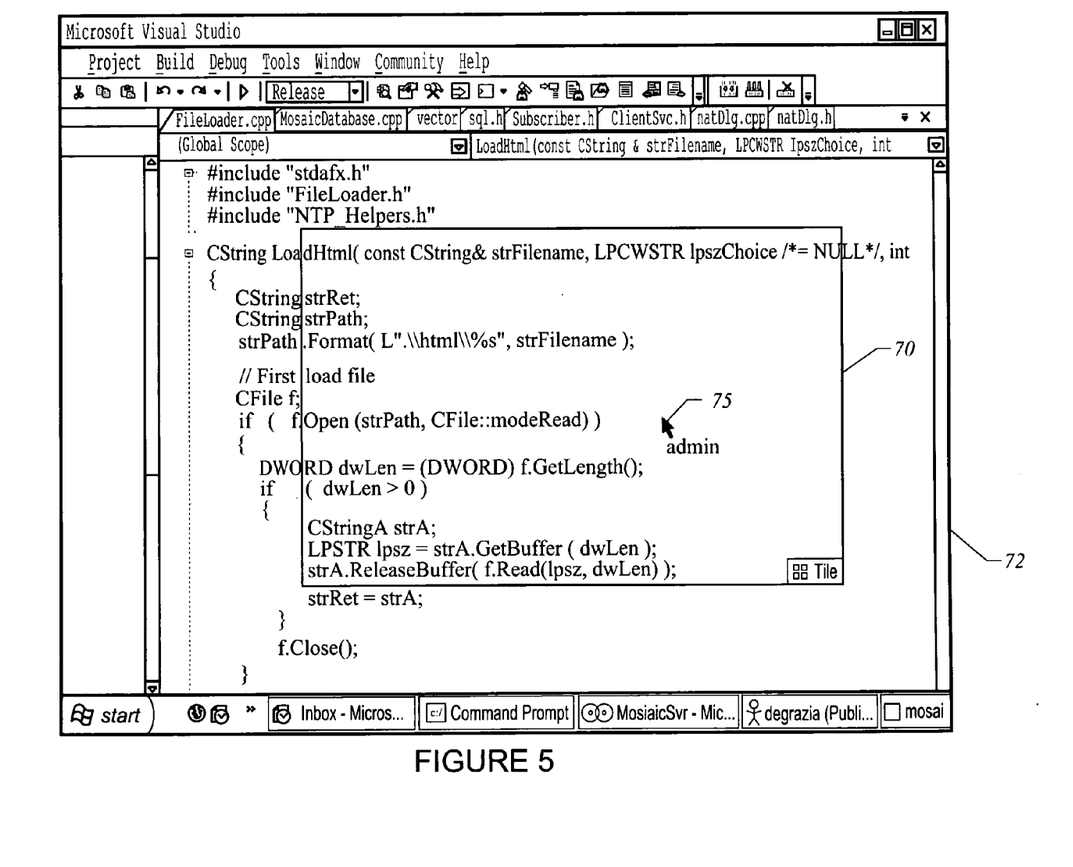
FIG. 5 is a screen shot illustrating a tile placed over a portion of a user's desktop.

FIG. 5 is a screen shot illustrating a tile 70 positioned over a portion of computer code displayed on a user's desktop 72. In this case, the user may want to share a section of the computer code without sharing the entire program. In one embodiment, the system is configured so that user input in the form of activity on the computer screen in a location of a tile is visually reported in all of the users' corresponding tiles. The tiles in the workspace are thus 'live' in that when a mouse is moved over a tile or clicked while positioned over the tile, or a keyboard is used to type in the tile, that input is transmitted to everyone in the workspace. For example, a remote mouse pointer 75 will show up in the tile 70 as a shadow pointer denoted with the alias of the remote user ('admin' in FIG. 5). This allows a remote user to point out things to the owner of the tile 70 by pointing and clicking a mouse within the space of the remote user's shared tile. Any application that is viewable on a user's desktop can thus become a collaborative application. For example, a notepad can become a collaborative to-do list.

Figure 6:
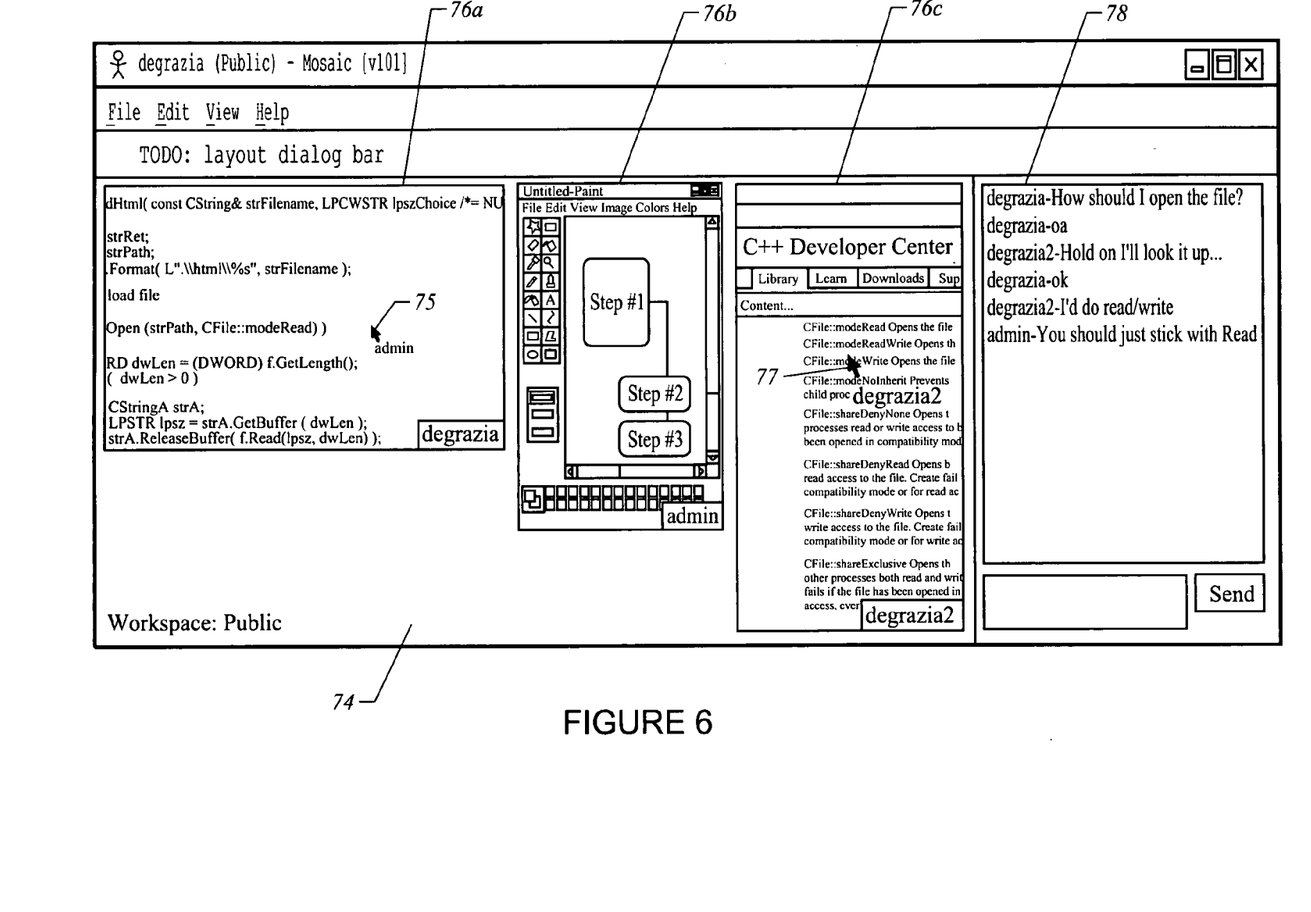
FIG. 6 is a screen shot illustrating one embodiment of a workspace on a user's desktop.

FIG. 6 is a screen shot showing a workspace 74 associated with the tile 70 shown in FIG. 5. The tile 70 is displayed as a shared tile 76a showing only the portion of the code within the borders of the user tile 70 (FIGS. 5 and 6). Other users' shared tiles 76b, 76c are also displayed in the workspace 74. Each shared tile 76a, 76b, 76c displays the users name (or other identifier) (e.g., degrazia, admin, and degrazia2 in FIG. 6). The workspace 74 also includes an identifier which shows the name of the workspace (e.g., Public in FIG. 6). A chat window 78 is shown positioned in the workspace 74 so that the users can chat while viewing and working with the shared tiles 76a, 76b, 76c. The chat window 78 displays communication between owners of the shared tiles 76a, 76b, 76c. The remote users' pointers 75, 77 are also displayed on the shared tiles 76a, 76c, respectively. Colors may be used to highlight the remote users activity within the shared tile. Each remote user may be assigned a different color, for example, to assist in differentiating the remote users. Keyboard input may be noted in a caption within the workspace 22, identifying the user that is doing the typing or may appear within the actual text of the shared tile. In one embodiment, the color of the remote user's mouse pointer changes color (e.g., to bright yellow) when the remote user is entering mouse or keyboard input.

Figure 7:
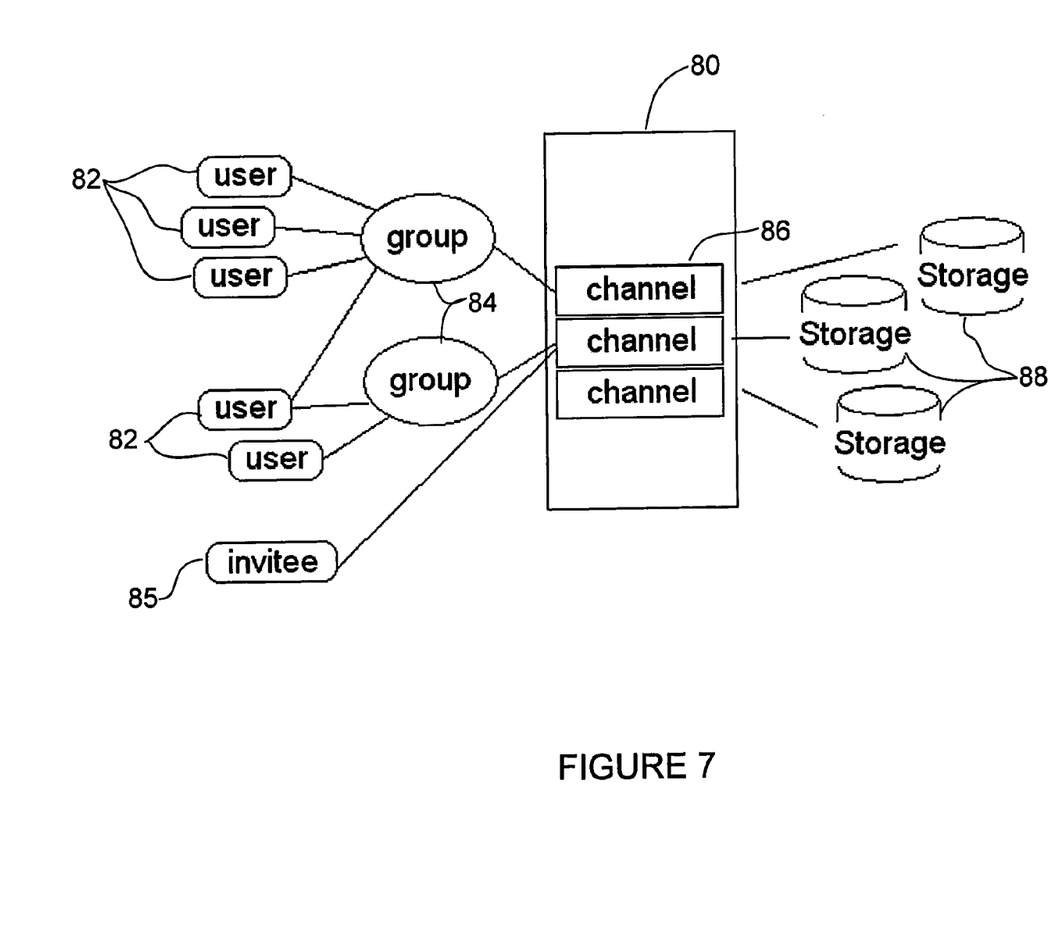
FIG. 7 is a block diagram illustrating a centralized device in communication with users for receiving, organizing, and transmitting shared data.
Figure 8:
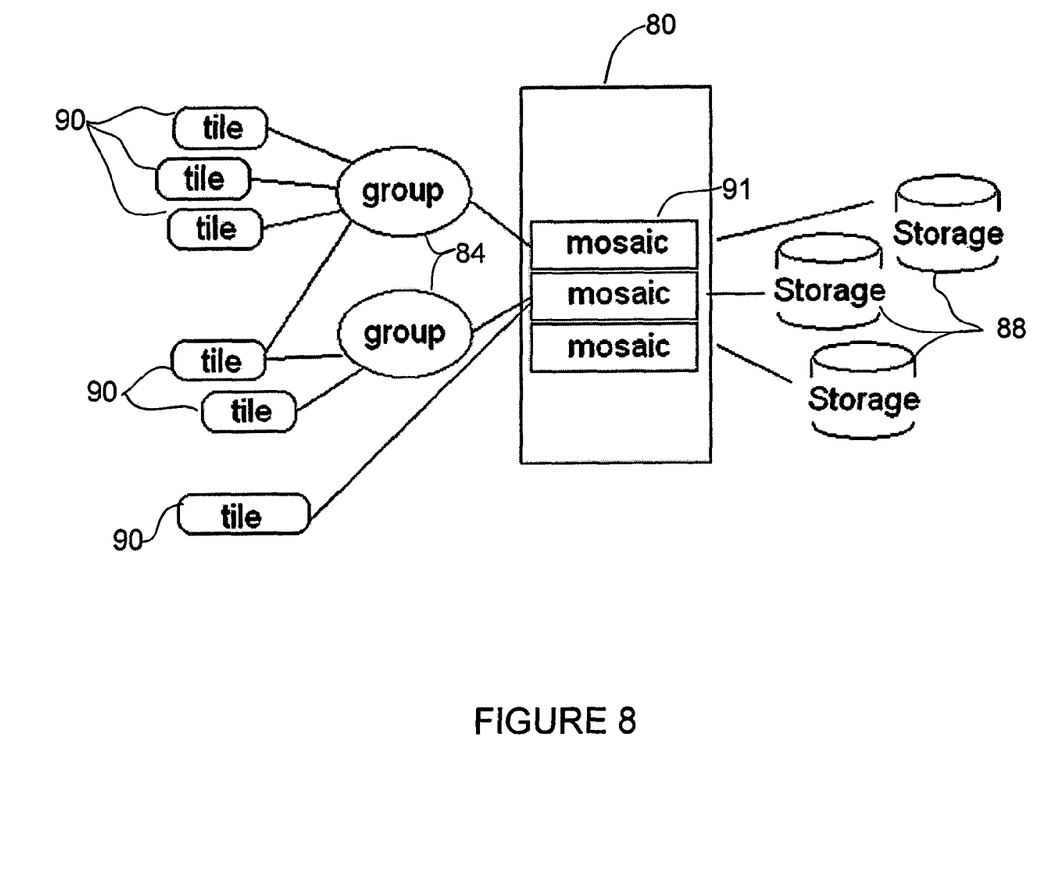
FIG. 8 is a block diagram illustrating the centralized device of FIG. 7 with the users identified by their associated tiles.

In one embodiment, the virtual desktop application is configured to communicate with server 16, which operates to receive, organize, and transmit the shared data contained within the tiles 20 and workspace 22 (FIG. 1). FIG. 7 illustrates one example of centralized network device 80 (e.g., server, host, gateway) interacting with a plurality of users 82 belonging to one or more groups 84. An invitee 85 may also participate in the session without belonging to one of the groups 84. The groups 84 are each associated with one or more communication channels 86 at network device 80. The device 80 receives data associated with a user tile and transmits the data to the appropriate communication channel 86 for distribution to the users active on the channel. The data may be stored at the network device 80 or remote storage 88 connected to the device. The device 80 is thus configured to provide user and group management, a directory of channels, and storage for files and data. FIG. 8 illustrates the device 80 organized by tiles 90 and mosaics (workspaces) 91.

In one embodiment, the user is presented with a login screen when the virtual desktop application is opened. For example, the user may have to enter a user name and password before joining a group or session. The user may be presented with a list of workspaces (e.g., channel 1, channel 2, channel 3, help desk, tech support, public) for which he is authorized to use or the user may start a new workspace. The list of workspaces may also indicate which workspaces are currently active and how many users are currently using the workspace.

An 'ad-hoc' workspace may also be created in order to facilitate a quick informal get together. For example, two people may be instant messaging and need to quickly share information, but do not want to use any of the pre-existing workspaces. In this case, an invite is generated that creates an ad-hoc workspace. This ad-hoc workspace may only exist while there are participants in it. When everyone has left the workspace, it would be eliminated.

Figure 9:
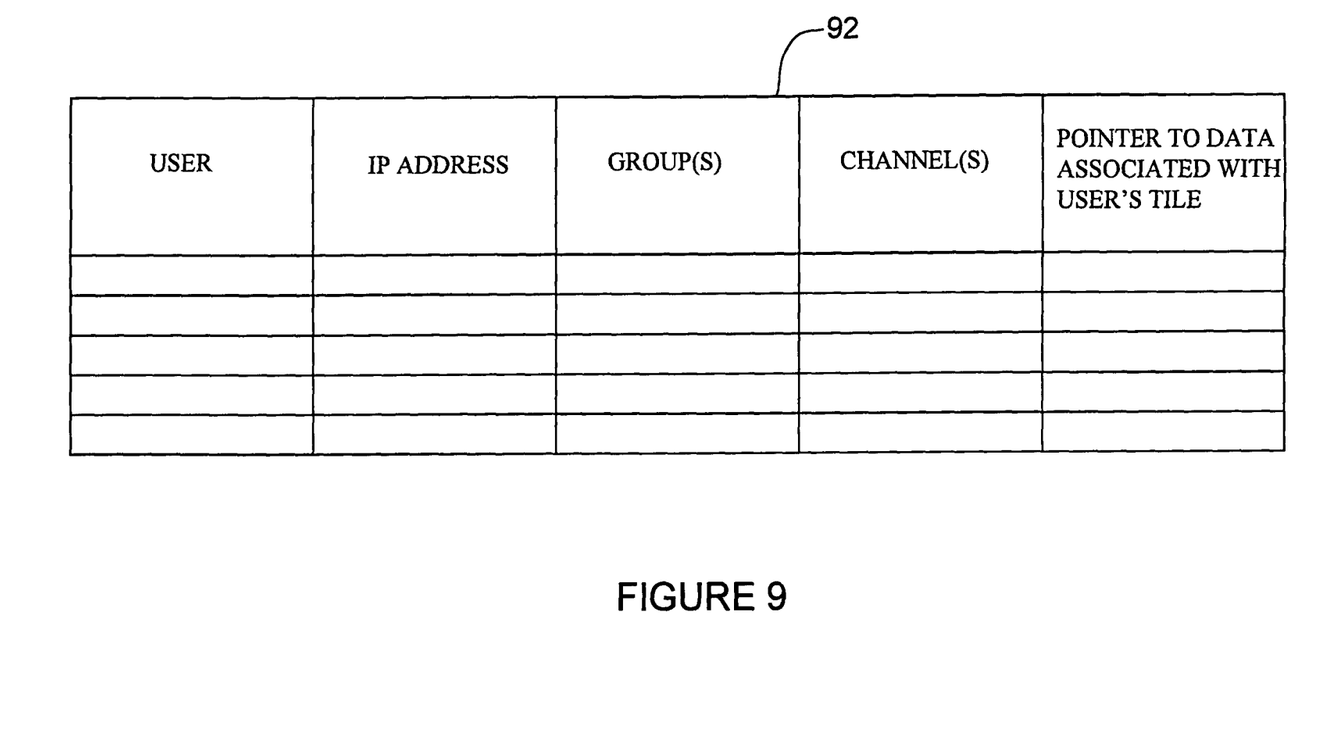
FIG. 9 is an example of a table stored at the centralized device of FIG. 7 for use in organizing users, groups, tiles, and communication channels.

The device 80 may maintain a table 92, such as shown in FIG. 9, which includes an entry for each user (client). Each user entry may include, for example, an IP address, the group (s) for which the user is a member, active channels the user is currently using, and a pointer to access stored data corresponding to the data located within the user's tile. It is to be understood that the arrangement shown in FIGS. 7 and 8 and the table shown in FIG. 9 are only examples for collecting and organizing the shared data and that other systems and methods may be used without departing from the scope of the invention. Also, the data may be directly shared between computers without the use of a centralized device.

Figure 10:
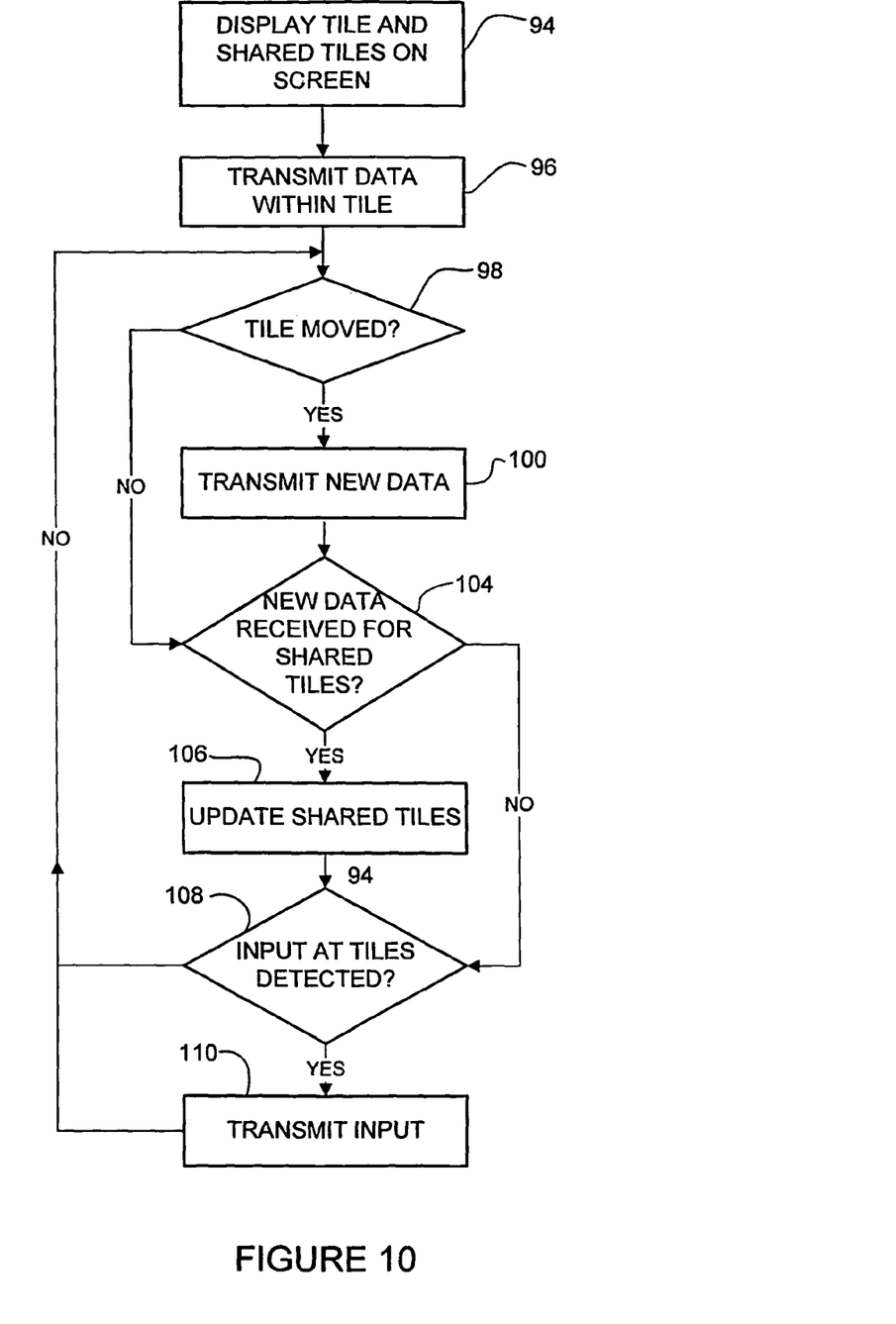
FIG. 10 is a flowchart illustrating a process for sharing data displayed on a user's computer screen, in accordance with one embodiment.

FIG. 10 is a flowchart illustrating a process for sharing data in a virtual desktop in accordance with one embodiment. Upon a user opening the virtual desktop application and selecting a workspace (channel), a tile is displayed on the user's desktop along with the active workspace (step 94). The user then positions the tile over the portion of his desktop that he wants to share with the group to identify data selected by the user for sharing. Data contained within the tile is transmitted to the other remote users and displayed on the appropriate shared tile (step 96). If the tile is moved, new data is transmitted and the user's shared tile in the workspace is updated (steps 98 and 100). If new shared data is received from remote users, the respective shared tiles are updated (steps 104 and 106). If the user provides input within any of the tiles (e.g., mouse movement, mouse clicks, keyboard strokes), the input is transmitted (steps 108 and 110). As discussed above, the data may be transmitted to and received from a centralized device 80 or the data may be transmitted directly to one or more remote users and received directly from the remote users.

Figure 11:
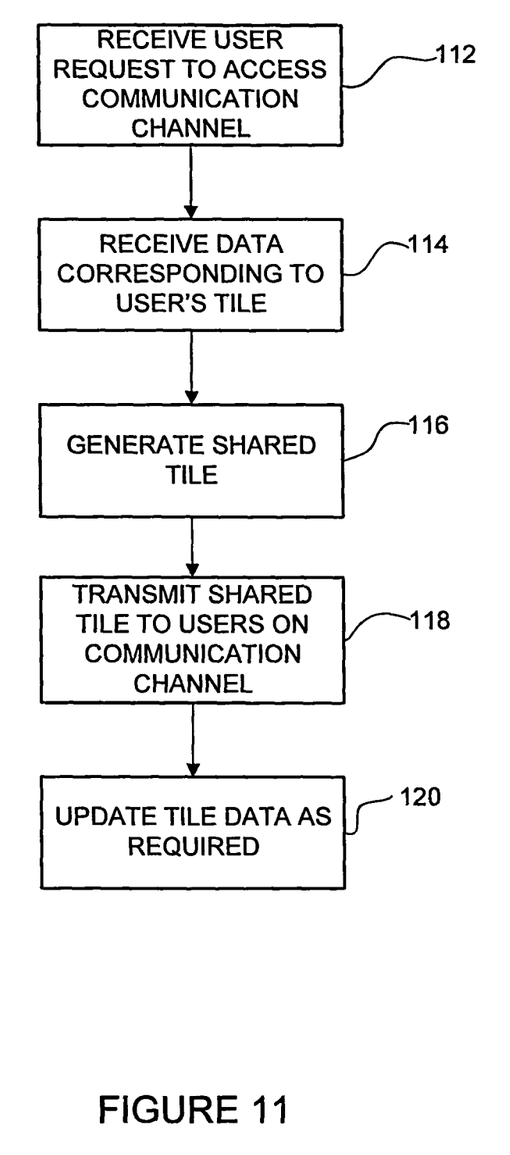
FIG. 11 is a flowchart illustrating a process for operating the centralized device of FIG. 7 to share data, in accordance with one embodiment.

FIG. 11 is a flowchart illustrating a process for receiving, generating, and transmitting shared data for the virtual desktops at a centralized device 80. The device 80 is in communication with a plurality of users. At step 112, a request to access a communication channel is received. This step may include receiving a password from the user and authorizing the user. The user may also be presented with a list of available workspaces (communication channels), as described above. The device 80 then receives data corresponding to the user's tile position on the computer screen (step 114). The device 80 uses this data to generate a shared tile (step 116). The device 80 may also generate a workspace or insert the shared tile into a previously created workspace associated with the active communication channel. The device 80 then transmits (e.g., broadcasts) the shared tile to the users logged into the communication channel (step 118). The data is updated as required upon receiving input from the users and transmitted to the users (step 120). The updates may be the result of movement of one or more of the users' tiles or input from one of the users at one of the tiles (e.g., mouse or keyboard activity directed to a location of one of the tiles).

As can be observed from the foregoing, the system and method provide numerous advantages. For example, a user can move easily from sharing one application to sharing another application by moving the tile. Furthermore, a portion of a desktop can be shared while still retaining a portion that is private. Since only a portion of a desktop is being shared, less data is shared, thus resulting in reduced bandwidth requirement and network resources. The system eliminates the need to open and close different applications in order to move from one application to another. Also, seamless transition of focus from one user's desktop to another enhances sharing and true collaboration.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for sharing data displayed on a user's computer screen, the method comprising:

displaying a movable tile on the user's computer screen, the tile being viewable, positionable, and sizable by the user on the computer screen to identify data displayed on the user's computer screen and selected for sharing with two or more remote users, the tile defining a virtual desktop for sharing data, wherein the tile is positioned over a portion of an application window and wherein said data identified by the position of the tile comprises only data displayed within a border of the tile;

transmitting said data identified by a position of the tile on the user's computer screen to said two or more remote users, wherein said identified data comprises only a portion of data displayed on the user's computer screen;

receiving shared data from said two or more remote users, said shared data corresponding to data displayed on a portion of the remote user's computer screen;

displaying said shared data on the user's computer screen;

receiving input identifying movement of the tile on the user's computer screen to select new data displayed on the user's computer screen, and transmitting said new data to said two or more remote users; and receiving user input on the user's computer screen within the tile and transmitting said user input to said two or more remote users, said user input identified by an identifier associated with the user;

wherein the tile comprises a control region that can be selected by the user and used to move and size the tile.

2. The method of claim 1 further comprising receiving input identifying movement of the tile on the user's computer screen to select new data displayed on the user's computer screen, and transmitting said new data to said two or more remote users.

3. The method of claim 1 further comprising receiving new shared data from one of the remote users and updating said shared data displayed on the user's computer screen.

4. The method of claim 1 further comprising receiving user input in the form of movement of a cursor on the user's computer screen within the tile and transmitting said user input to said two or more remote users.

5. The method of claim 1 wherein displaying said shared data on the user's computer screen comprises displaying said shared data within a designated workspace on the user's computer screen.

6. The method of claim 1 wherein displaying said shared data on the user's computer screen comprises displaying an identifier associated with the remote user sharing said shared data.

7. The method of claim 1 wherein said user input is in the form of activity on the user's computer screen in a location said shared data is displayed on the user's computer screen.

8. An apparatus comprising:
- a processor configured to receive data from a plurality of users, said data corresponding to data displayed on only a portion of a user's computer screen and identified by a tile positioned on the computer screen, generate shared tiles from said data, transmit said shared tiles to said plurality of users for display on the users' computer screens, receive input identifying movement of the tile on the user's computer screen to select new data displayed on the user's computer screen, transmit said new data to said plurality of users, and receive user input on the user's computer screen within the tile and transmit said user input to said plurality of users, said user input identified by an identifier associated with the user; and
- memory for at least temporarily storing said received data and said shared tiles
- wherein the tile is viewable, positionable, and sizable by a user on the computer screen to identify said portion of the user's computer screen, the tile defining a virtual desktop for sharing data and positioned over a portion of an application window, and said data identified by the position of the tile comprises only data displayed within a border of the tile.

9. The apparatus of claim 8 wherein said processor is configured to transmit to one or more of said plurality of users, a list of one or more communication channels available to the user for sharing said data.

10. The apparatus of claim 9 wherein said processor is configured to receive a request from one of said plurality of users to join one of said communication channels, wherein said received data and said shared tiles is transmitted on said communication channel.

11. The apparatus of claim 8 wherein said user input is in the form of activity on one of the user's computer screen in a location said shared tile is displayed on the user's computer screen.

12. The apparatus of claim 8 wherein said processor is configured to organize said shared tiles in a workspace and transmit said workspace to said plurality of users.

13. The apparatus of claim 8 wherein said user input comprises keyboard input.

14. The apparatus of claim 8 wherein said user input comprises movement of a cursor.

15. The apparatus of claim 8 wherein said user input is identified by a color assigned to the user.

16. Logic encoded in one or more non-transitory media for execution and when executed operable to:
- display a movable tile on the user's computer screen, the tile being viewable, positionable, and sizable by the user on the computer screen to identify data displayed on the user's computer screen and selected for sharing with two or more remote users, the tile defining a virtual desktop for sharing data, wherein the tile is positioned over a portion of an application window and said data identified by the position of the tile comprises only data displayed within a border of the tile;
- transmit said data identified by a position of the tile on the user's computer screen to said two or more remote users, wherein said identified data comprises only a portion of data displayed on the user's computer screen;
- display shared data received from said two or more remote users on the user's computer screen, said shared data corresponding to data displayed on the remote user's computer screen;
- receive input identifying movement of the tile on the user's computer screen to select new data displayed on the user's computer screen and transmit said new data to said two or more remote users; and
- receive user input on the user's computer screen within the tile and transmit said user input to said two or more remote users, said user input identified by an identifier associated with the user;
- wherein the tile comprises a control region that can be selected by the user and used to move and size said tile.

17. The logic of claim 16 further operable to receive input identifying movement of the tile on the user's computer screen to select new data displayed on the user's computer screen, and transmit said new data to said two or more remote users.

18. The logic of claim 16 further operable to receive new shared data from one of the remote users and update said shared data displayed on the user's computer screen.

19. The logic of claim 16 wherein the logic operable to display said shared data on the user's computer screen is further operable to display said shared data within a designated workspace on the user's computer screen.

20. The logic of claim 16 wherein said user input is in the form of activity on the user's computer screen in a location said shared data is displayed on the user's computer screen.

* * * * *